United States Patent [19]

Antonen

[11] Patent Number: 4,754,013
[45] Date of Patent: Jun. 28, 1988

[54] SELF-ADHERING POLYORGANOSILOXANE COMPOSITIONS

[75] Inventor: Robert C. Antonen, San Ramon, Calif.

[73] Assignee: Dow Corning Corporation, Midland, Mich.

[21] Appl. No.: 947,113

[22] Filed: Dec. 29, 1986

[51] Int. Cl.$^4$ .............................................. C08G 77/06
[52] U.S. Cl. ...................................... 528/15; 528/17; 528/31; 528/32; 525/478; 525/479
[58] Field of Search ...................... 528/15, 17, 31, 32; 525/478, 479

[56] References Cited

U.S. PATENT DOCUMENTS

| | | |
|---|---|---|
| 3,262,830 | 7/1966 | Vincent .................................. 528/17 |
| 3,708,467 | 1/1973 | Smith, Jr. et al. ...................... 528/17 |
| 4,087,585 | 5/1978 | Schulz . |
| 4,196,273 | 4/1980 | Imai et al. . |
| 4,311,739 | 1/1982 | Hardman et al. . |
| 4,401,500 | 8/1983 | Hamada et al. . |
| 4,593,049 | 6/1986 | Bauman et al. ......................... 528/15 |
| 4,613,630 | 9/1986 | Bauman et al. ......................... 528/15 |

FOREIGN PATENT DOCUMENTS 220349  12/1984  Japan .

Primary Examiner—Melvyn I. Marquis
Attorney, Agent, or Firm—Robert Spector

[57] ABSTRACT

The combination of (1) a polyorganosiloxane composition curable by a platinum catalyzed hydrosilation reaction with (2) up to about 20 percent, based on the weight of (1), of a polyorganosiloxane composition comprising the mixture of a liquid hydroxyl-terminated polydiorganosiloxane and a moisture reactive organosilicon crosslinking agent, or the reaction product of said mixture, and an organotitanate catalyst yields elastomers that cure rapidly at temperatures of at least about 80 degrees C. and cohesively bond to inorganic substrates such as glass and metal. The resultant cured elastomer exhibits a durometer or less than about 20 on the Shore A durometer scale.

6 Claims, No Drawings

SELF-ADHERING POLYORGANOSILOXANE COMPOSITIONS

BACKGROUND OF THE INVENTION

1. Field of the Invention

This invention relates to polyorganosiloxane compositions. More particularly, this invention relates to polyorganosiloxane compositions that cure to elastomeric materials capable of adhering to inorganic substrates such as metals, glass and ceramics.

2. Description of the Prior Art

One class of polyorganosiloxane compositions cure by a platinum-catalyzed hydrosilation reaction to form elastomeric materials referred to in the art as "silicone rubber". The curable compositions typically comprise a polyorganosiloxane containing at least two vinyl or other ethylenically unsaturated hydrocarbon radicals per molecule, an organohydrogensiloxane containing an average of at least three silicon bonded hydrogen atoms per molecule and a platinum-containing catalyst. Depending upon the specific reactants present in the composition curing can occur at ambient or elevated temperatures.

A second class of polyorganosiloxane compositions cure at room temperature, typically about 25 degrees centigrade, in the presence of moisture. The reactants in this type of composition comprise a hydroxyl terminated polydiorganosiloxane and a silane or other relatively low molecular weight organosilicon compound containing at least three alkoxy or other hydrolyzable groups per molecule. Alternatively, these two materials can be pre-reacted to form a polydiorganosiloxane containing at least two hydrolyzable groups at each end of the molecule. Irrespective of the manner in which it is prepared, the composition reacts in the presence of moisture and a suitable catalyst for the hydrolysis reaction to form a crosslinked material. Suitable catalysts include metal compounds such as inorganic and organic tin compounds and titanium compounds such as ortho-esters and chelates formed by reacting these orthoesters with polyfunctional, enolizable ketones.

The unique physical and chemical properties of cured polyorganosiloxane elastomers, particularly their durability and resistance to solubilization and degradation under a variety of conditions make these elastomers desirable for numerous applications, including protective coatings for substrates such as semiconductor devices that are susceptible to damage by physical abuse or by exposure to humidity and/or contaminants present in the environment.

Polyorganosiloxane compositions that cure by a platinum catalyzed hydrosilation reaction are useful for those applications where a curing time of hours or even minutes is required at ambient or elevated temperatures. A deficiency of many polyorganosiloxane elastomers of this type is their relatively poor adhesion to metals and other inorganic substrates.

Moisture curable polyorganosiloxane compositions are typically one part materials that cure at room temperature. The compositions must be allowed to cure for at least several hours even at elevated temperatures to achieve a tack-free surface that is not sticky to the touch. Curing times of 24 hours or longer are usually required to achieve a useful level of physical properties.

One method for improving the adhesion of polyorganosiloxane elastomers to inorganic substrates such as metal and glass is to first coat the substrate with a liquid primer composition that typically includes at least one moisture reactive organosilicon compound. U.S. Pat. No. 4,401,500, which issued to Hamada and Yasuda on Aug. 30, 1983 teaches using an alkyltrialkoxysilane, a organic hydroperoxide and an organic solvent as a primer composition for bonding a silicone rubber to a substrate.

Primer compositions containing a vinyl substituted silane, an organohydrogensiloxane, a platinum-based catalyst and an organic titanate are disclosed in Japanese patent publication No. 84/220349, which was published on Dec. 11, 1984.

Primers are less than desirable as a means to achieve bonding between a polyorganosiloxane elastomer and a substrate because the primer composition must be applied and allowed to cure or at least dry before the curable polyorganosiloxane elastomer composition can be applied to the substrate.

A second method for improving the bonding between a polyorganosiloxane elastomer curable by a platinum catalyzed hydrosilation reaction and a substrate is by the use of adhesion promoters that are added to the curable polyorganosiloxane composition. U.S. Pat. No. 4,196,273, which issued to Imai and Tanaka on Apr. 1, 1980 teaches adding an alkoxysilane having an aliphatically unsaturated hydrocarbon radical to a polyorganosiloxane composition that is curable by a platinum catalyzed hydrosilation reaction.

U.S. Pat. No. 4,311,739, which issued to Hardman and Dujak on Jan. 19, 1982 teaches the use of partial hydrolysis products of an aliphatically unsaturated hydrolyzable alkoxysilane such as vinyltriethoxysilane to improve the adhesion exhibited by the same type of polyorganosiloxane compositions described by Imai et al.

Adhesion promoters consisting essentially of the combination of (1) a polyorganosiloxane containing a hydroxyl group and a vinyl radical and (2) an epoxysilane are disclosed in U.S. Pat. No. 4,087,585, which issued to Schulz on May 2, 1978.

Certain moisture cured polyorganosiloxane elastomers that in the uncured form comprise a mixture or reaction product of a liquid hydroxyl terminated polydiorganosiloxane and a tri or tetraalkoxysilane in addition to an organotitanate curing catalyst have been shown to function as protective coatings for integrated circuits and other semiconductor devices. The disadvantage of these compositions is their relatively long cure times.

The present inventor found that when up to about ten percent by weight of a moisture curable composition of this type is blended with a platinum-catalyzed polyorganosiloxane composition of the type described hereinbefore, the resultant elastomer combines the adhesion of the moisture cured elastomer with the rapid curing rate and good dielectric properties of the platinum catalyzed composition.

SUMMARY OF THE INVENTION

The combination of (1) a polyorganosiloxane composition curable by a platinum catalyzed hydrosilation reaction with (2) up to about 10 percent, based on the weight of (1), of a polyorganosiloxane composition comprising the mixture of a liquid hydroxyl-terminated polydiorganosiloxane and a moisture reactive organosilicon crosslinking agent, or the reaction product of said mixture, and an organotitanate catalyst yields elastomers that cure rapidly at temperatures above about 50 degrees C. and cohesively bond to inorganic substrates such as glass and metal. The resultant cured elastomer exhibits a durometer of less than about 20 on the Shore A durometer scale.

DETAILED DESCRIPTION OF THE INVENTION

This invention provides a curable, self adhering polyorganosiloxane composition comprising the product obtained by blending to homogeneity A. a first organosiloxane material which is curable by a platinum-catalyzed hydrosilation reaction and comprises (1) a liquid polydiorganosiloxane containing two vinyl radicals per molecule, (2) an organohydrogensiloxane containing at least three silicon bonded hydrogen atoms per molecule in an amount sufficient to cure the vinyl containing materials present in said composition; and (3) a platinum containing catalyst in an amount sufficient to promote curing of said vinyl containing materials;

B. from 0 to 60 percent by weight, based on the weight of said first organosiloxane material, of a benzene-soluble copolymer consisting essentially of diorganovinylsiloxy units, triorganosiloxy units and $SiO_{4/2}$ units, where the molar ratio of the combination of diorganovinylsiloxy and triorganosiloxy units to $SiO_{4/2}$ units is from 0.7:1 to 1.2:1, inclusive, and the diorganovinylsiloxy units constitute from 2 to 8 percent by weight of said copolymer;

C. from 0.1 to 20 percent by weight, based on the weight of said first organosiloxane material, of a moisture curable organosiloxane material that is compatible with said first organosiloxane material and comprises (1) a mixture of a liquid hydroxyl terminated polydiorganosiloxane and a crosslinking agent consisting essentially of a silane wherein the silicon atom is bonded to at least three alkoxy groups or a reaction product of said mixture, where there is present at least 0.5 mole of silane per mole of silicon bonded hydroxyl groups in the polydiorganosiloxane; and (2) an amount sufficient to promote curing of said moisture curable organosiloxane material of a catalyst selected from the group consisting of titanium orthoesters and chelated titanium compounds.

where the elastomer obtained by curing said composition exhibits a durometer of no greater than 20 on the Shore A durometer scale.

The feature that characterizes the curable polyorganosiloxane compositions of this invention is the addition of a titanium catalyzed, moisture curable organosiloxane material to a organosiloxane material that is curable by a platinum catalyzed hydrosilation reaction. To achieve cohesive bonding between the cured elastomer and the substrate the two organosiloxane materials should be compatible and the hardness value of the elastomer should be no higher than about 20 on the Shore A durometer scale. The present inventor has now found that elastomers exceeding this hardness value typically do not cohesively bond to inorganic substrates such as metals and glass.

As used herein the term "compatible" implies that the ingredients of the addition reaction curable and moisture curable materials are miscible with one another at the concentrations used in the present compositions and do not interfere with curing of either material.

Methods for controlling the hardness of cured polyorganosiloxane elastomers are known to those skilled in the art. These methods typically involve adjusting the concentration of curing agent(s) and the molecular weight of the polydiorganosiloxane ingredients to achieve the desired crosslink density, i.e. the number of crosslinks per unit area, one of the primary factors in determining the hardness of the cured material. For the compositions of this invention, the critical parameter in controlling hardness appears to be the crosslink density of the cured elastomer. As discussed hereinabove, the extent of crosslinking is determined at least in part by the ratio of silicon bonded hydrogen atoms to vinyl radicals and the molecular weight of the vinyl-containing polydiorganosiloxane. The Addition Reaction Curable Polyorganosiloxane Material The organosiloxane material that constitutes the major portion of the present compositions is curable to an elastomer by a platinum catalyzed hydrosilation reaction between a curing agent containing silicon bonded hydrogen atoms and one or more organosiloxane compounds containing silicon bonded vinyl or other ethylenically unsaturated hydrocarbon radicals.

In the present compositions the ethylenically unsaturated reactant is a substantially linear polydiorganosiloxane containing an ethylenically unsaturated radical, typically a vinyl radical, at each of the two terminal positions, and the curing agent contains at least three silicon bonded hydrogen atoms per molecule. These type of compositions are well known.

The individual ingredients of the addition reaction curable material of the present compositions will now be described in detail.

The preferred polydiorganosiloxane ingredient of the addition reaction curable material can be represented by the general formula

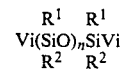

where Vi represents a vinyl radical and each $R^1$ and $R^2$ individually represents a monovalent hydrocarbon or halogenated hydrocarbon radical that is free of ethylenic unsaturation and contains from 1 to 20 carbon atoms. The value of n is equivalent to a viscosity of from 0.1 to about 100 Pa.s at 25 degrees C. When R represents a hydrocarbon radical it can be alkyl, cycloalkyl, aryl, alkaryl or aralkyl. Alternatively, at least one of $R^1$ and/or $R^2$ can represent any of these radicals containing one or more halogen atoms as substituents. Chlorine and fluorine are the preferred substituents. Preferably at least a portion of the radicals represented by $R^1$ and $R^2$ are lower alkyl or haloalkyl, each of which contain from 1 to 4 carbon atoms. Most preferably the $R^1$ radicals are methyl, and the radicals represented by $R^2$ can be methyl, 3,3,3-trifluoropropyl and/or phenyl, this preference being based on the availability of the starting materials used to prepare these polymers. The value of n is preferably equivalent to a viscosity of from 1 to about 40 Pa.s at 25 degrees C., most preferably up to about 10 Pa.s.

The reaction mixture can contain a single polydiorganosiloxane ingredient. Alternatively two or more polydiorganosiloxanes of different molecular weights can be present. It has been found that in some instances the physical properties of the cured elastomer, particularly resiliency and tear strength, are improved by using a combination of high and low molecular weight polydiorganosiloxanes. In preferred embodiments the low molecular weight species exhibits a viscosity of from about 0.1 to about 3 Pa.s at 25 degrees C. and the high molecular weight species exhibits a viscosity of from 20 to about 40 Pa.s at 25 degrees C.

In addition to at least one polydiorganosiloxane, the present compositions can optionally contain up to 60 percent by weight, based on the weight of the addition reaction curable material, of a resinous vinyl-containing organosiloxane copolymer. These resinous copolymers are particularly desirable if the curable composition does not contain a reinforcing filler such as finely divided silica.

It is believed that the resinous copolymer reacts during curing of the addition reaction curable material, and is thereby incorporated into the structure of the final elastomer. The presence of more that about 60 percent by weight, based on the addition reaction curable material, of the copolymer may increase the viscosity of the composition to the extent that it not useful as a coating composition even when diluted with an organic solvent.

The resinous copolymer contains repeating units of the general formula $SiO_2$ in addition to triorganosiloxy units of the general formulae $R^3{}_3SiO_{\frac{1}{2}}$ and diorganovinylsiloxy units of the general formula $CH_2=CH(R^4)_2 SiO_{\frac{1}{2}}$. In these formulae $R^3$ and $R^4$ are individually selected from the same group as $R^1$ defined hereinabove.

The molar ratio of the combination of triorganosiloxy units and diorganovinylsiloxy units to $SiO_2$ units in the resinous copolymer is from 0.7 to 1.2, inclusive. The vinyl-containing units constitute from 2 to 8 percent by weight of the copolymer, which preferably contains at least two vinyl radicals per molecule. In preferred embodiments of the copolymer the ranges for the molar ratio of diorganovinylsiloxy:triorganosiloxy:$SiO_2$ units is 0.08–0.1:0.06–1:1.

The resinous copolymers can be prepared as described in U.S. Pat. No. 2,676,182, which issued to Daudt and Tyler on Apr. 20, 1954 and is hereby incorporated in this specification by reference thereto. The copolymers described in this patent contain from 2 to 23 percent by weight of hydroxyl groups, which is considerably above the maximum level of about 0.8 weight percent preferred for precursors of the present copolymers. The hydroxyl content of the precursor can be conveniently reduced to the desired level by employing a higher concentration of triorganosiloxane capping agent than the concentration range taught by Daudt et al.

Briefly, the method of Daudt et al. comprises reacting a silica hydrosol under acidic conditions with the appropriate amount of hexamethyldisiloxane or trimethylchlorosilane. The resinous copolymers used to prepare the present elastomers can be obtained by reacting Daudt et al's. product with the required amount of a hexaorganodisilazane or a hexaorganodisiloxane wherein each silicon atom contains a vinyl radical and two methyl or other hydrocarbon radicals represented by $R^4$ in the foregoing formula.

Preferred compositions contain from 10 to about 40 percent by weight of one of the resinous organosiloxane copolymers described hereinbefore, based on the weight of the addition reaction curable organosiloxane material.

To ensure compatibility of the reactants it is preferable that the silicon bonded hydrocarbon radicals present on the polydiorganosiloxane, curing agent and any resinous organosiloxane copolymer present in the addition curable polyorganosiloxane material be identical. Most preferably these hydrocarbon radicals are methyl or a combination of methyl and either phenyl or 3,3,3-trifluoropropyl, this preference being based on the availability of the intermediates used to prepare the polydiorganosiloxane.

The vinyl containing polydiorganosiloxane and the resinous organosiloxane copolymer present in the addition reaction curable polyorganosiloxane material are cured to form an elastomer by a hydrosilation reaction with the silicon-bonded hydrogen atoms present on the curing agent.

The curing agent contains from as few as four silicon atoms per molecule up to an average of 20 or more, and can have a viscosity of up to 10 Pa.s or higher at 25 degrees C. The repeating units that can be present in this ingredient include but are not limited to $HSiO_{1.5}$, $R^5HSiO$ and/or $R^6{}_2HSiO_{0.5}$ in addition to one or more of monoorganosiloxy, diorganosiloxane, triorganosiloxy and $SiO_2$ units. In these formulae $R^5$ and $R^6$ represent monovalent hydrocarbon or halocarbon radical as defined hereinabove for the $R^1$ radical of the addition reaction curable polydiorganosiloxane. Alternatively the organohydrogensiloxane can be a cyclic compound containing diorganosiloxane and organohydrogensiloxane units or a compound of the formula $Si(OSiR^5{}_2H)_4$.

Most preferably $R^5$ and $R^6$ are methyl and the curing agent is a linear trimethylsiloxy terminated dimethylsiloxane/methylhydrogensiloxane copolymer containing an average of from 10 to about 50 repeating units per molecule of which from 3 to 5 are methylhydrogensiloxane.

The molecular weights of the vinyl containing polydiorganosiloxane and organohydrogensiloxane curing agent together with the number and distribution of the silicon-bonded hydrogen atoms and vinyl radicals within these reactants and the molar ratio of vinyl radicals to silicon bonded hydrogen atoms will determine the concentration and location of crosslinks in the cured elastomers prepared using the present compositions. The concentration of crosslinks per unit area is often referred to as the "crosslink density" and determines certain physical properties of the cured elastomer, particularly hardness. compressibility and resiliency. The particular combinations of polydiorganosiloxane(s), curing agent(s) and optional resinous organosiloxane copolymer yielding the optimum combination of these physical properties can readily be determined by routine experimentation with a knowledge of this invention.

To ensure that the hardness value of cured elastomers prepared using the present curable compositions does not exceed about 40 on the Shore A durometer scale, the additional curable polyorganosiloxane material should contain a stoichiometric excess of either ethylenically unsaturated hydrocarbon radicals such as vinyl or silicon bonded hydrogen atoms. This material preferably contains at least 1.5 vinyl or other ethylenically radicals for each silicon bonded hydrogen atom present in the curing agent.

Hydrosilation reactions are typically conducted in the presence of a catalyst that is a platinum group metal or a compound of such a metal. Platinum compounds such as hexachloroplatinic acid, and particularly complexes of these compounds with relatively low molecular weight vinyl-containing organosiloxane compounds are preferred catalysts because of their high activity and compatibility with the organosiloxane reactants. These complexes are described in U.S. Pat. No. 3,419,593 that issued to David N. Willing on Dec. 31, 1968, Complexes with low molecular weight organosiloxanes wherein the silicon bonded hydrocarbon radicals are vinyl and either methyl or 3,3,3-trifluoropropyl are particularly preferred because of their ability to catalyze a rapid curing of the elastomer at temperatures of at least about 80 degrees C.

The platinum containing catalyst can be present in an amount equivalent to as little as one part by weight of platinum per one million parts of curable composition. Catalyst concentrations equivalent to from 5 to 50 parts of platinum per million of curable composition are preferred to achieve a practical curing rate. Higher concentrations of platinum provide only marginal improvements in curing rate, and are therefore economically unattractive, particularly when the preferred catalysts are used.

Mixtures of the aforementioned vinyl-containing reactants, curing agent and platinum-containing catalysts may begin to cure at ambient temperature. To increase the storage stability of these compositions or obtain a longer working time or "pot life", the activity of the catalyst under ambient conditions can be retarded or suppressed by the addition of a suitable inhibitor.

Known platinum catalyst inhibitors include the acetylenic compounds disclosed in U.S. Pat. No. 3,445,420, which issued on May 20, 1969 to Kookootsedes et al. Acetylenic alcohols such as 2-methyl-3-butyn-2-ol constitute a preferred class of inhibitors that will suppress the activity of a platinum-containing catalyst at 25 degrees C. Compositions containing these inhibitors typically require heating at temperatures of 80 degrees C. or above to cure at a practical rate.

If it desired to increase the pot life of a curable composition under ambient conditions, this can be accomplished using an olefinically substituted siloxane of the type described in U.S. Pat. No. 3,989,667, which issued on Nov. 2, 1876 to Lee and Marko. Cyclic methylvinylsiloxanes are preferred.

Inhibitor concentrations as low as one mole of inhibitor per mole of platinum will in some instances impart satisfactory storage stability and cure rate. In other instances inhibitor concentrations of up to 500 or more moles of inhibitor per mole of platinum are required. The optimum concentration for a given inhibitor in a given composition can readily be determined by routine experimentation and does not constitute part of this invention.

The Moisture Curable Polyorganosiloxane Material

The material believed responsible for imparting cohesive bonding to cured elastomers prepared using the present compositions is a moisture curable organosiloxane material comprising the combination of (1) at least one hydroxyl terminated polydiorganosiloxane and (2) at least one silane containing at least three alkoxy groups per molecule. Alternatively the polydiorganosiloxane and the silane can be pre-reacted as taught in the art. It is believed that when these ingredients are added separately together with a suitable catalyst, at least a portion of them react to form terminal units wherein at least two alkoxy radicals are bonded to a silicon atom. The polyorganosiloxane material also includes at least one of the titanium compounds that the prior art discloses as suitable catalysts for curing of this type of polyorganosiloxane material in the presence of moisture.

The hydroxyl terminated polymers used to prepare the moisture curable portion of the present compositions typically exhibit the formula

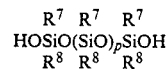

where each $R^7$ and $R^8$ individually represents a monovalent hydrocarbon or halogenated hydrocarbon radical as described hereinbefore for the $R^1$ radical present in the addition reaction curable composition, and the value of p is equivalent to a viscosity of from 1 to about 10 Pa.s at 25 degrees C.

The curing agent portion of the moisture curable material is a silane containing at least three silicon bonded alkoxy groups per molecule. The silane can be represented by the formula $R^9_p Si(OR^{10})_{4-p}$, where $R^9$ is selected from the same group as $R^1$, $R^{10}$ represents an alkyl radical containing from 1 to 4 carbon atoms and p is 0 or 1. Preferably both $R^9$ and $R^{10}$ represent methyl or ethyl. To ensure that an adequate amount of curing agent is available to react with the hydroxyl terminated polymer, the molar ratio of curing agent to hydroxyl groups in the hydroxyl terminated polydiorganosiloxane should be greater than 0.5. Even though some of the alkoxy groups may react with extraneous water present in the composition or hydroxyl groups present on any filler, the number of alkoxy groups remaining will be sufficient to cure the polydiorganosiloxane.

The hydroxyl terminated polydiorganosiloxane and curing agent can be added as separate ingredients when preparing the moisture curable ingredient of the present compositions. Alternatively, the polydiorganosiloxane and curing agent can be pre-reacted in the presence of a suitable silanol condensation catalyst to obtain a polydiorganosiloxane containing at least two alkoxy groups of the curing agent at each of the two terminal positions.

The moisture curable material also contains a titanium compound as the curing catalyst. Suitable curing catalysts are well known in the art, and include, for example, titanium orthoesters of the formula $Ti(OR^{11})_4$, where $R^{11}$ represents an alkyl radical containing from 1 to 10 carbon atoms. $R^{11}$ is preferably butyl, based on the commercial availability of these compounds. Another class of useful titanium catalysts are the chelates formed by reacting a titanium compound of the formula $TiZ_4$ with a beta-diketone. In this formula Z represents a radical selected from the group consisting of monovalent aliphatic hydrocarbonoxy radicals and monovalent acyloxy radicals, each having from 1 to 18 carbon atoms, inclusive. hydroxyl radicals and divalent oxygen atoms forming a TiOTi linkage. These chelated titanium compounds are described in U.S. Pat. No. 3,334,067 which issued to Weyenberg on Aug. 1, 1967.

The curable compositions of this invention are prepared by blending together the ingredients of the addition reaction curable polyorganosiloxane material and the moisture curable polyorganosiloxane material to form a homogeneous composition. The two materials can be prepared prior to being blended or the ingredients of these materials can be combined at the time the present composition is prepared. The blending can be accomplished using any of the mixing devices conventionally used to prepare polyorganosiloxane compositions, including blade type and dough type mixers. The specific equipment used will be determined by the viscosity of the composition and the amount of material being prepared. Compositions having viscosities of up to about 1 Pa.s at 25 degrees C. can be blended using blade type mixers operating at speeds of up to about 200 revolutions per minute. The higher viscosity compositions are preferably blended using dough type mixers.

The blending of ingredients is continued until the mixture is homogeneous, i.e. the composition appears uniform to the eye and samples taken from different locations within the composition exhibit substantially identical concentrations of the ingredients making up the compositions.

To achieve cohesive bonding during curing of the present compositions without the slow long cure rate characteristic of the moisture curable polyorganosiloxane material, the concentration of moisture curable material should be between 0.1 and about 20 percent by weight, based on the weight of the addition curable organosiloxane material. The adhesion of cured compositions containing less about 0.1 percent by weight of the moisture curable material is not substantially better than that of the unmodified addition reaction curable material. As the concentration of moisture curable material is increased, the bond strength between the cured elastomer and the substrate will typically continue to improve with a corresponding decrease in the cure rate of the composition. When the weight of moisture curable material exceeds about 20 percent of the weight of the addition curable material, the time interval required to cure the composition typically increases to a value that may no longer be acceptable for many end use applications of the compositions, particularly protective coatings.

In addition to the previously defined ingredients of the moisture curable and addition reaction curable polyorganosiloxane materials, the curable compositions of this invention can also contain one or more additives conventionally present in polyorganosiloxane compositions, so long as these additives do not interfere with curing of the composition. Additives that can be present in the compositions include but are not limited to reinforcing and non-reinforcing fillers, pigments, dyes, stabilizers to inhibit degradation of the cured elastomers by heat and/or ultraviolet light, flame retarding agents and adhesion promoters. Suitable adhesion promoters for the preset compositions include silanes containing at least two silicon bonded alkoxy groups and an silicon bonded organofunctional group such as vinyl or gamma-methacryloxypropyl. Finely divided silica is preferred as a reinforcing filler. The silica is usually treated with an organosilicon compound such as a low molecular weight hydroxyl terminated polydiorganosiloxane or a hexaorganodisilazane to prevent "crepe hardening" of the curable composition.

Properties of the Present Curable Composition and Cured Elastomers Prepared Therefrom Curable compositions containing the addition reaction curable and moisture curable materials described in the preceding paragraphs typically exhibit viscosities of up to 100 Pa.s at 25 degrees C. To facilitate blending and transfer of the compositions and minimize entrapment of air during mixing a viscosity of from 0.5 to 10 Pa.s at 25 degrees C. is preferred.

The curable compositions of this invention are cured by heating them at temperatures of from about 80 to about 200 degrees C. Curing time for the compositions is from several minutes to several hours, depending upon the type and amount of catalyst inhibitor in the addition curable material and the relative amount of moisture curable material.

Cured elastomers prepared using the present compositions typically exhibit hardness values of up to 20 measured on the Shore A durometer scale in accordance with test method no. D-2240 of the American Society of Testing and Materials (ASTM).

The cured elastomers prepared using the polyorganosiloxane compositions of this invention are suitable for fabricating articles by molding, casting or any other technique conventionally used to process liquid or pumpable polyorganosiloxane compositions.

The elastomers of this invention are particularly useful as protective coatings for electronic devices, including solid state devices such as transistors and integrated circuits. Compositions containing the aforementioned resinous organosiloxane copolymers are often transparent to visible, infra-red and/or ultraviolet light. These transparent elastomers can be used as optical waveguides and as a light transmitting medium in photoelectronic devices such as photodiodes and optocouplers.

The following examples describe preferred compositions of this invention and are not intended to limit the scope of the invention described in the accompanying claims. All parts and percentages in the examples are by weight unless otherwise specified.

EXAMPLE 1

This example demonstrates the combination of rapid curing and good adhesion that can be achieved using a composition of this invention.

An addition reaction curable material of this invention, referred to hereinafter as I, was prepared by blending the following ingredients to homogeneity:
  65.5 parts of a phenylmethylvinylsiloxy terminated polydimethylsiloxane exhibiting a viscosity of 2 Pa.s at 25 degrees C.,
  42 parts of a benzene soluble resinous copolymer of triorganosiloxy units and $SiO_2$ units in the mol ratio of about 0.7 mol of triorganosiloxy units per mol of $SiO_2$ units where the triorganosiloxy units are trimethylsiloxy units and dimethylvinylsiloxy units such that the resin copolymer contains about 1.8 weight percent vinyl radicals.
  2.6 parts of a trimethylsiloxy terminated polymethylhydrogensiloxane having a viscosity of about 0.13 Pa.s at 25 degrees C. and a silicon-bonded hydrogen atom content of about 1.6 percent by weight,
  0.02 part of cyclic methylvinylsiloxanes and,
  as the platinum catalyst, a product obtained by reacting hexachloroplatinic acid with a liquid dimethylvinylsiloxy terminated polydimethylsiloxane and a liquid dimethylhydrogensiloxy terminated polydimethylsiloxane. The amount of catalyst was equivalent to 3 parts per million of platinum, based on the weight of the addition reaction curable material.

A moisture curable material of this invention, referred to hereinafter as II, was prepared by blending to homogeniety 77.9 parts of a hydroxyl terminated polydimethylsiloxane exhibiting a viscosity of 4.0 Pa.s at 25 degrees C., 15.6 parts of silica that had been previously treated with hexamethyldisilazane, 6.0 parts of methyltrimethoxysilane and 0.5 parts of tetrabutyl titanate.

Two curable compositions of this invention were prepared by blending to homogeniety a mixture of 20 parts of the addition reaction curable material I and either 0.4 or 2.0 parts of the moisture curable material II.

The two curable compositions were placed in individual aluminum weighing cups and cured by placing the cups for one hour in an oven maintained at a temperature of 150 degrees C. After the cured compositions had cooled to about ambient temperature the adhesion between the resultant optically clear coating and the aluminum surface was evaluated by attempting to lift an edge of the coating away from the surface by inserting a metal spatula blade between the coating and the substrate. If the coating fractured leaving material adhering to the aluminum surface, the failure was rated as "cohesive". If the entire coating could be separated from the substrate without leaving a portion adhering to the substrate, the failure was rated as "adhesive". Both of the cured compositions exhibited cohesive failure.

The elastomer prepared using 0.4 parts of the moisture curable composition exhibited a hardness value of 12 on the Shore A durometer scale and the elastomer containing 2.0 parts of the moisture curable organosiloxane exhibited a hardness value of 15 on the same scale.

For comparative purposes a curable composition outside the scope of this invention containing only the addition curable organosiloxane material identified as I was cured and evaluated for adhesion as described in the immediately preceding paragraphs. The coating separated as a single piece from the substrate when pried with a metal spatula blade inserted between the coating and the substrate. Substantially none of this material remained adhered to the aluminum surface when the cured coating was removed. The failure was therefore rated as "adhesive". This cured elastomer exhibited a hardness value of 23 on the Shore A scale.

EXAMPLE 2

This example describes a second preferred embodiment of the present compositions and uses a second type of addition reaction curable organosiloxane material with the same moisture curable material described in example 1.

An addition reaction curable material (III) was prepared by combining the following ingredients and blending to homogeniety:

67.5 parts of a dimethylvinylsiloxy terminated polydimethylsiloxane exhibiting a viscosity of 2 Pa.s at 25 degrees C., 36.3 parts of benzene soluble resinous copolymer of triorganosiloxy units and $SiO_2$ units in the molar ratio of about 0.7 mol of triorganosiloxy units per mol of $SiO_2$ units where the triorganosiloxy units are trimethylsiloxy units and dimethylvinylsiloxy units such that the resin copolymer contains about 1.8 weight percent vinyl radicals, 6.2 parts of a trimethylsiloxy terminated dimethylsiloxane/methylhydrogensiloxane copolymer containing 0.7 percent by weight of silicon bonded hydrogen, 0.07 part of a chloroplatinic acid complex with divinyltetramethyldisiloxane diluted with sufficient liquid dimethylvinylsiloxy terminated polydimethylsiloxane to provide 0.7 weight percent platinum. The preparation of this type of complex is described in U.S. Pat. No. 3,419,593 to Willing, and 0.2 part of cyclic methylvinylsiloxanes.

The moisture curable organosiloxane material was composition II described in Example 1.

Three curable polyorganosiloxane compositions of this invention were prepared by blending 20 parts of addition reaction curable composition III to homogeniety with 0.02, 0.1 and 0.5 part of the moisture curable material described in Example 1. The compositions were placed on individual glass microscope slides and cured by being placed for one hour in an oven maintained at a temperature of 150 degrees C. All of the resultant coatings were optically clear and exhibited cohesive failure to the glass surfaces when an attempt was made to scrape them off using a spatula.

A control composition containing only III exhibited adhesive failure when evaluated under the same conditions.

Cohesive failure was achieved when a curable composition containing 20 parts of III and 0.5 part of the moisture curable composition II described in Example 1 was applied to an aluminum panel that had previously been cleaned by washing it with methyl ethyl ketone and then wiping it with a Kimwipe ® tissue. The coating was cured by heating the coated panel for 1.5 hours in an oven maintained at a temperature of 150 degrees C.

A control composition containing only composition III exhibited a mixture of adhesive and cohesive failure when prepared and evaluated under the same conditions.

That which is claimed is:

1. A curable, self adhering polyorganosiloxane composition comprising the product obtained by blending to homogeneiety A. a first organosiloxane material which is curable by a platinum-catalyzed hydrosilation reaction and comprises (1) a liquid polydiorganosiloxane containing two vinyl radicals per molecule, (2) an organohydrogensiloxane containing at least three silicon bonded hydrogen atoms per molecule in an amount sufficient to cure the vinyl containing materials present in said composition; and (3) a platinum containing catalyst in an amount sufficient to promote curing of said vinyl containing materials:

B. from 0 to 60 percent by weight, based on the weight of said first organosiloxane composition, of a benzene-soluble copolymer, consisting essentially of units of the general formula $SiO_2$, in addition to triorganosiloxy units of the general formula $R^3{}_3SiO_{\frac{1}{2}}$ and diorganovinylsiloxy units of the general formula $CH_2=CH(R^4)_2SiO_{\frac{1}{2}}$, where the molar ratio of the combination of diorganovinylsiloxy and triorganosiloxy units to $SiO_{4/2}$ units is from 0.7:1 to 1.2:1, inclusive, and the diorganovinylsiloxy units constitute from 2 to 8 percent by weight of said copolymer;

C. from 0.1 to 20 percent by weight, based on the weight of said first organosiloxane material, of a moisture curable organosiloxane material that is compatible with said first organosiloxane material and comprises (1) a mixture of a liquid hydroxyl terminated polydiorganosiloxane and a crosslinking agent consisting essentially of a silane wherein the silicon atom is bonded to at least three alkoxy groups or a reaction product of said mixture, where there is present at least 0.5 mole of silane per mole of silicon-bonded hydroxyl groups in the polydiorganosiloxane: and (2) an amount sufficient to promote curing of said moisture curable organosiloxane material of a titanium orthoester catalyst, where the elastomer obtained by curing said composition exhibits a durometer of no greater than 20 on the Shore A durometer scale.

2. A composition according to claim 1 where the liquid polydiorganosiloxane of said first organosiloxane material corresponds to the formula

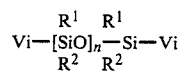

where each $R^1$ and $R^2$ individually represents a monovalent hydrocarbon or halogenated hydrocarbon radical that is free of ethylenic unsaturation and contains from 1 to 20 carbon atoms and the value of n is equivalent to a viscosity of from 0.1 to about 100 Pa.s at 25 degrees C.; the repeating units of said organohydrogensiloxane are selected from the group consisting of $HSiO_{1.5}$, $R^5HSiO$, $R^6_2HSiO_{0.5}$, and, optionally, at least one member of the group consisting of monoorganosiloxy, diorganosiloxane, triorganosiloxy and $SiO_2$ units, where $R^5$ and $R^6$ are individually selected from the same group as $R^1$; said benzene-soluble copolymer consists essentially of the repeating units $SiO_2$, $R^3_3SiO_{\frac{1}{2}}$ and $CH_2=CH(R^4)_2 SiO_{\frac{1}{2}}$, where $R^3$ and $R^4$ are individually selected from the same group as $R^1$; said hydroxyl terminated polydiorganosiloxane is represented by the formula

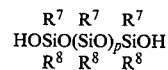

where each $R^7$ and $R^8$ is individually selected from the same group as $R^1$, and the value of p is equivalent to a viscosity of from 1 to about 10 Pa.s at 25 degrees C. and said silane is of the formula $R^9_pSi(OR^{10})_{4-p}$, where $R^9$ is selected from the same group as $R^1$, $R^{10}$ represents an alkyl radical containing from 1 to 4 carbon atoms and p is 0 or 1.

3. A composition according to claim 2 where $R^1$, $R^3$, $R^4$, $R^5$, $R^6$ and and $R^7$ represent methyl, $R^2$ and $R^8$ are individually selected from the group consisting of methyl, phenyl and 3,3,3-trifluoropropyl, and $R^9$ and $R^{10}$ are individually methyl or ethyl.

4. A composition according to claim 3 where $R^2$ and $R^3$ are methyl, said benzene-soluble copolymer constitutes from 10 to 40 percent by weight of said first organosiloxane material, the platinum containing catalyst is the reaction product of chloroplatinic acid with a cyclic or linear polyorganosiloxane, and the concentration of moisture curable organosiloxane material is from 0.1 to 10 percent by weight, based on the weight of said first organosiloxane material.

5. A composition according to claim 4 where the liquid polydiorganosiloxane of said first organosiloxane material comprises a dimethylvinylsiloxane terminated polydiemthylsiloxane, and the repeating units of said organohydrogensiloxane consist essentially of methylhydrogensiloxane units or a combination of methylhydrogensiloxane and dimethylsiloxane units.

6. A composition according to claim 4 where said hydroxyl terminated polydiorganosiloxane is a polydimethylsiloxane, said crosslinking agent is methyltrimethylsilane, the catalyst present in said moisture curable organosiloxane material is tetrabutyl titanate and said moisture curable material contains a reinforcing silica filler.

* * * * *